April 25, 1961 M. TAMBURRI 2,981,266
MOBILE CAR WASHING SYSTEM
Filed May 15, 1958 4 Sheets-Sheet 2

INVENTOR.
MICHAEL TAMBURRI
BY
ATTORNEY

April 25, 1961 M. TAMBURRI 2,981,266
MOBILE CAR WASHING SYSTEM
Filed May 15, 1958 4 Sheets-Sheet 4

INVENTOR.
MICHAEL TAMBURRI
BY
ATTORNEY

2,981,266
MOBILE CAR WASHING SYSTEM

Michael Tamburri, 451 S. 17th St., Newark, N.J.

Filed May 15, 1958, Ser. No. 735,412

2 Claims. (Cl. 134—72)

The present invention relates to a mobile car washing unit and it particularly relates to a car washing unit which may be readily moved from place to place.

It is among the objects of the present invention to provide a mobile or portable car washing unit which may be readily transported from place to place and which may be set up depending upon traffic or other conditions where there is a demand for car washing service.

Another object is to provide a novel car washing system which will actively assure washing of a car within limited space as may be available in predetermined locations depending upon traffic conditions and marketing facilities.

A further object of the present invention is to provide a car washing facility which will lend itself to be associated with or form a part of marketing installations, such as marketing centers, particularly which are attractive to the farm trade or to the country trade.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

According to the preferred objects of the present invention a portable installation is provided which may be transported upon its own wheeled carriage structure or it may be separately installed upon a trailer wheel structure for movement from place to place and which when located at a desired marketing facility may be positioned upon its own wheels or lowered into a pit so as to form a convenience for those shopping in the vicinity to have their cars washed and cleaned while waiting.

It is among the objects of the present invention to provide a basis which will successively provide washing and drying stations through which the car may be transported other than by its own engine and desirably by a carrier mechanism such as a chain or belt. The side walls of the facility may be of such a nature that they can be let down to provide sideways or sidewalks upon which attendants may be stationed along the sides of the car and means are desirably provided to dispose of the wash water or to recirculate the wash water after the cleaning operations if desired.

Where the base secured be a home base or a base upon a trailer, elevated from the ground ramps may be provided to permit the car to move up to the base and thereafter move down from the base. The sides of the car when swung out to form the sideways or walkways may be of a transparent plastic material so as to form an attractive wall structure.

The control mechanism is desirably placed at one end of an installation and desirably on the side of the installation so that it may be readily accessible even though vehicles may be passing through the installation being washed, dried and otherwise cleaned.

It is an important feature of the present invention that all of the equipment is positioned or mounted on a single base structure which is of itself provided with carrier wheels or may be readily positioned upon a trailer by use of side structures being foldable or mountable on the main base structure so that when the need for this facility is satisfied or passes, the entire unit may be readily transported from place to place.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
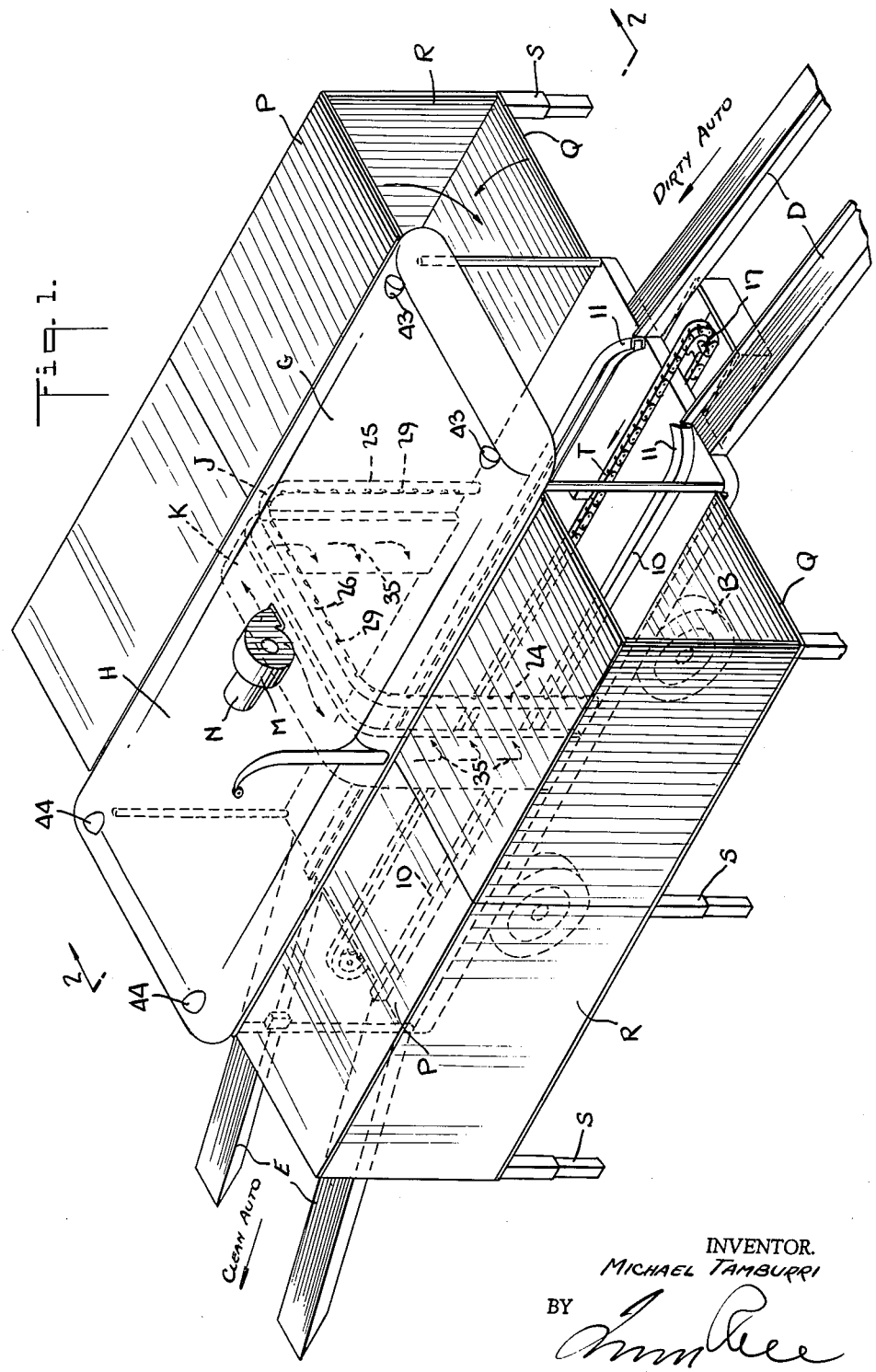
Figure 1 is a top perspective view of an extended mobile car washing system according to the present invention which has been moved into a location and set up for car washing purposes.
Figure 2:
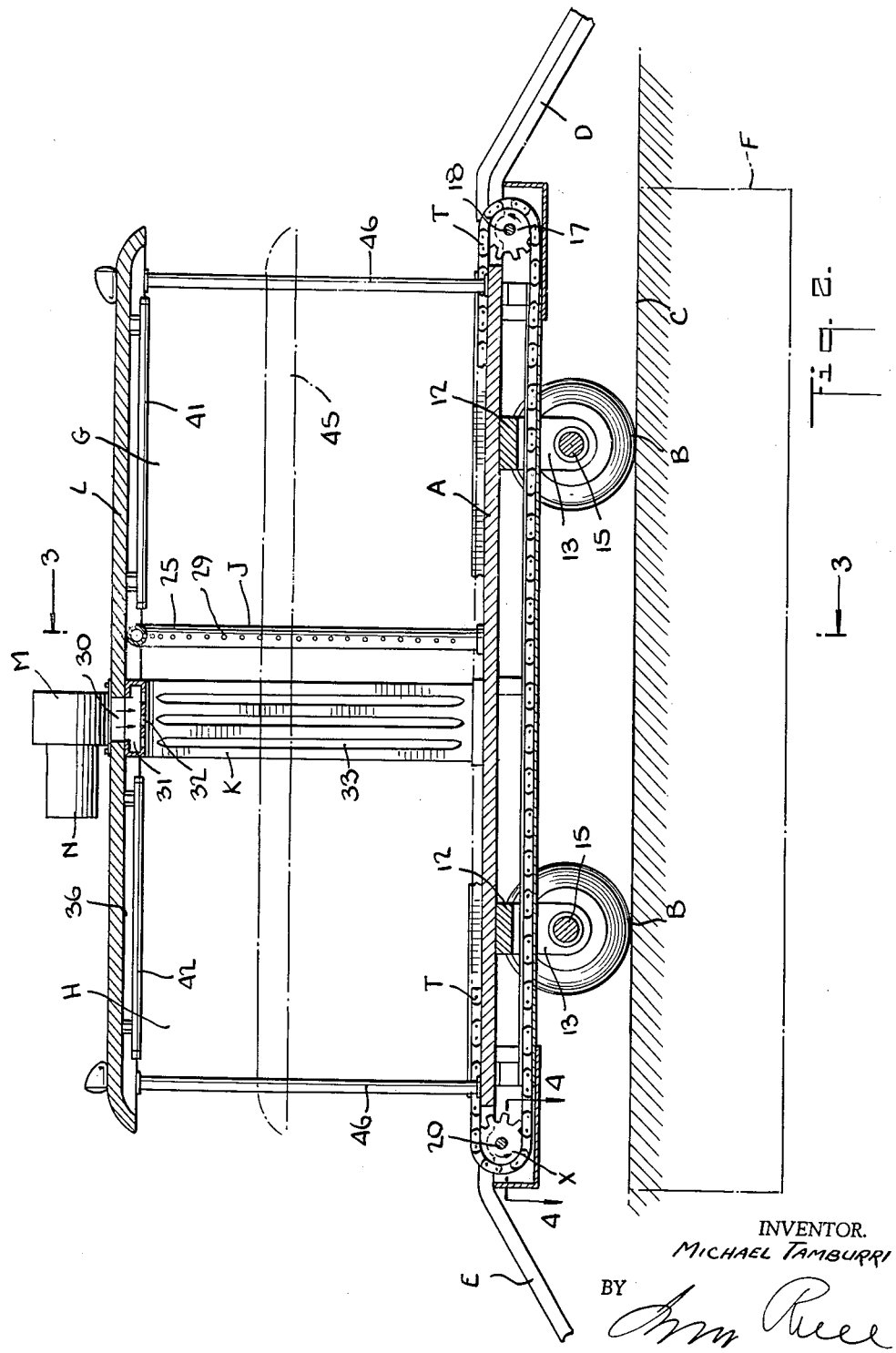
Fig. 2 is a transverse longitudinal sectional view upon the line 2—2 of Fig. 1 upon the same scale as Fig. 1.
Figure 3:
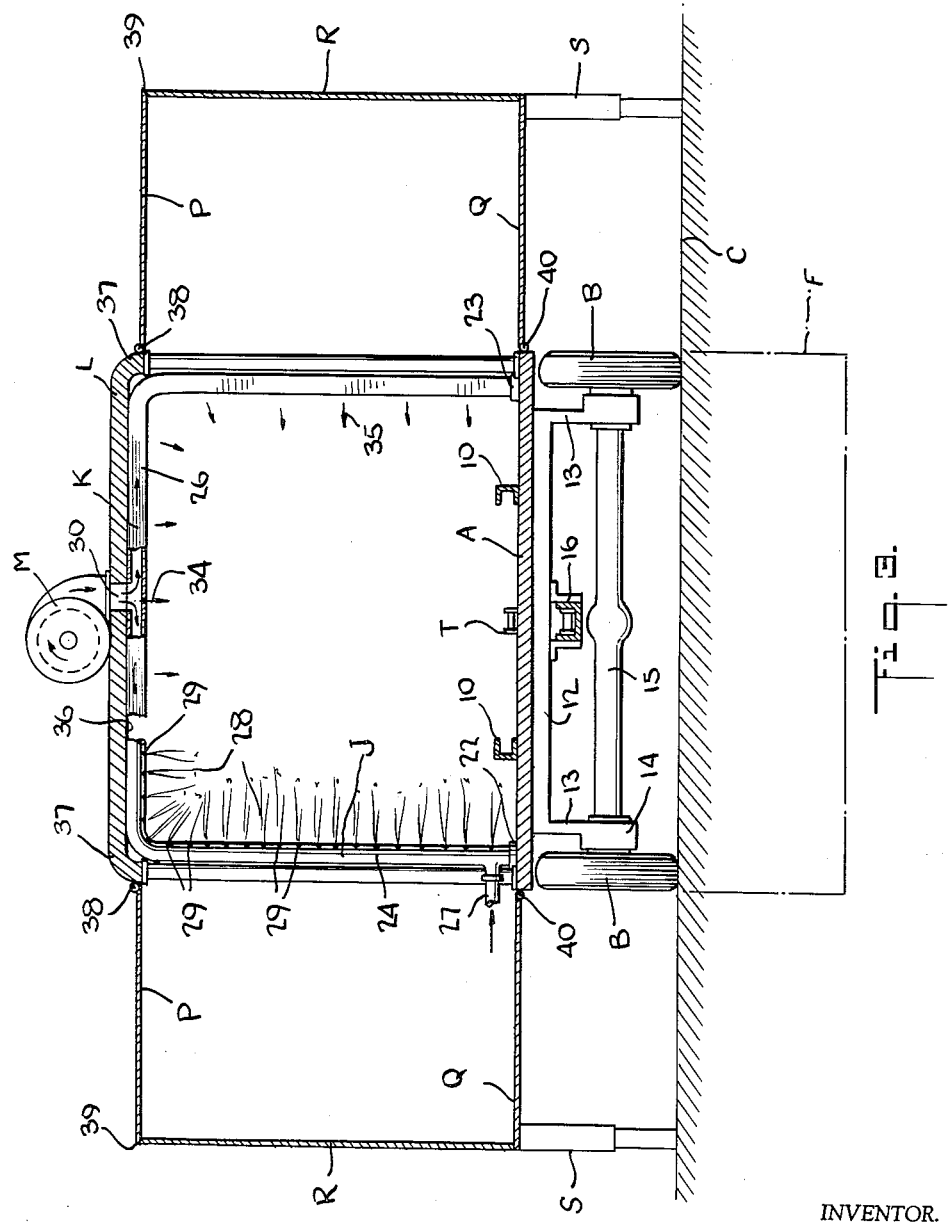
Fig. 3 is a transverse vertical sectional view taken upon the line 3—3 of Fig. 2.

Referring to Figs. 1 to 3, there is shown a base structure A having the wheels B which may be readily transported along a road or to a desired position C.

Instead of the wheels B the base structure or floor A may be readily mounted upon a tractor base for transportation or dismantling from such tractor base to be located at any desired position depending upon traffic conditions and requirements or other marketing facilities.

The wheels B may either be mounted on the ground or hardstand or even upon a pivot rod extension and in which case have the upgoing ramps D and the downgoing ramps E respectively for the automotive vehicle to be cleaned and the automobile after cleaning.

Figure 4:
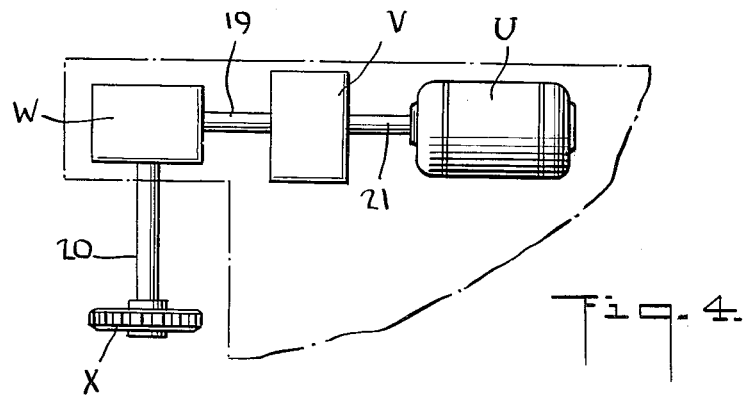
Fig. 4 is a diagrammatic layout view showing the drive mechanism as it appears from above while positioned below the floor of the main base structure, said view being taken upon the line 4—4 of Fig. 2.

The ground may be removed, as indicated in Fig. 4, if it is desired to place the structure in a pit with the floor A substantially at or even below ground level.

Normally there will be an inlet G in the inlet side of the truck and an outlet area H at the outlet side of the truck. Between these areas there is located the sprinkler system J which is followed by the blower system K.

The entire structure will be covered by a roof member L upon which the blower unit M may be located with its associated motor N.

The sides of the vehicle normally carry the hinged top elements P and the hinged lower walkway elements Q.

These elements are swung together along the sides of the unit when being transported from place to place and when moved outwardly after installation as indicated in Figs. 1 and 3.

Extra walls R may be positioned with the legs S to provide sheltered walkways for attendants to walk along in the surface of the vehicle being moved through the inlet and outlet spaces G and H, respectively and under and through the water spray J and the blower arrangement K.

The actual movement of the vehicle through the chambers G and H is accomplished by means of the chain T (see Figs. 1 and 2) which is driven by means of the motor U, the speed regulator V, the gear box W and the sprocket wheel X. (See also Fig. 4.)

Figure 5:
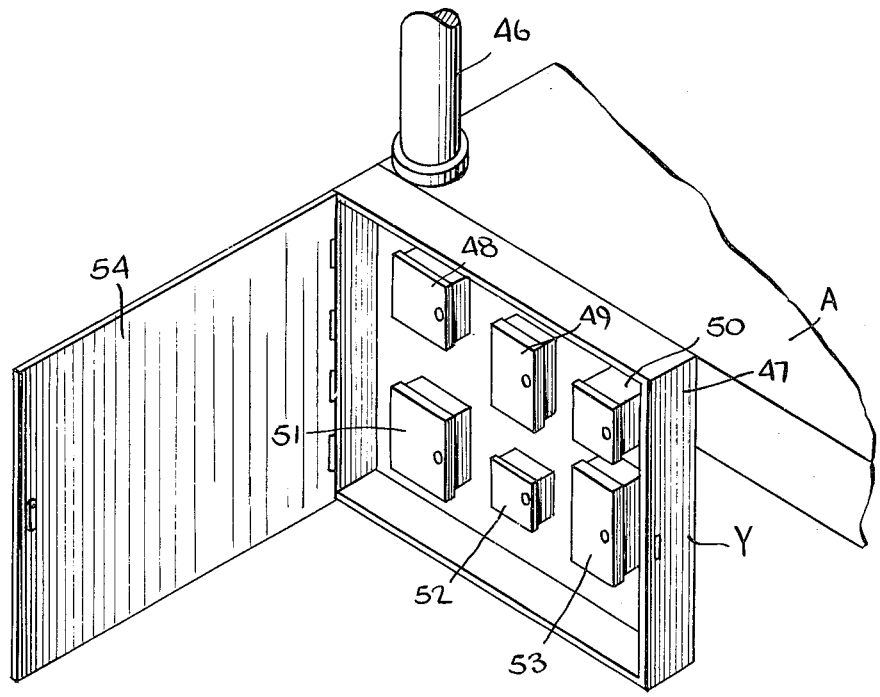
Fig. 5 is an end fragmentary perspective view showing the control box at one end of the base floor structure.

The circuit box Y of Fig. 5 may be positioned at one end of the floor A where it would be readily accessible even though a vehicle may be in the process of being moved through the chambers G and H or up or down the ramps D and E.

Referring particularly to Figs. 1 to 3, the base A has the side tracks 10 which may be of U-shaped cross section which converge together at 11 adjacent the inlet end. The under-structure 12 (see Fig. 3) which may be replaced by a trailer structure has the downwardly extending bearing arms 13 which carry the end bearings 14 for the transverse shaft 15. The ends of the shaft 15 carry the wheels B.

The chain T will pass through U-channel 16 in its movement from the exit end to the inlet end of the bed A, then it will pass over the inlet sprocket 17 on the shaft 18 where a car may be attached thereto.

At the exit end the chain T passes over the drive sprocket X on the shaft 20.

As shown in Fig. 4 the drive sprocket X is driven through the shaft 20 from the gear box W. The gear box in turn is driven by the shaft 19 from the variable speed control V.

The main motor drive U will drive the speed regulator through the shaft 21. Usually the unit as shown in Fig. 4 will be supported below the floor A usually under the left side adjacent the exit end but it also may be supported at the right side adjacent the exit end.

The water spray unit is best shown in Figs. 1, 2 and 3 and it consists of the supports 22 and 23 which have the uprights 24 and 25 connected at the top inside of the roof L by a cross member 26. The inlet 27 will supply water under pressure to cause a spray 28 to flow out of each of the three sides of the pipe.

Immediately beyond the inverted U-shaped water pipe J will be a U-shaped structure K for blowing air upon the sides and top of the automotive vehicle.

The unit K receives air at substantial velocity through the inlet 30 from the blower M. The air then flows into an inlet chamber 31 where it will pass through the openings 32 at the top and the openings 33 at the sides to form a blast of air as indicated by the arrows 34 and 35 in Fig. 3.

It will be noted that the top elements 26 and 31 of the inverted U-shaped structures J and K closely fit against the inside face 36 of the roof L. The sides of the roof L are downturned as indicated at 37 and hinged thereto at 38 are the top canopy elements P which may be of a translucent or transparent reinforced sheet plastic material such as glass fiber reinforced methyl methacrylate which may be corrugated for strength reasons.

The side channels R which may be removable are hinged at 39 to the canopy elements P and are also desirably of the same translucent or transparent material and they are desirably colored green or blue to add to the attractiveness of the structure.

At the sides of the base or vehicle A are the hinge structures 40 which carry the metal walkups Q which may be supported by the removable legs or feet S.

The interior of the chambers G and H may receive the fluorescent lights 41 and 42 extending longitudinally of the roof L and the exterior of the roof at the ends thereof may receive the floodlights 43 and 44.

When the vehicle is being transported the structures P and Q may be folded against the sides with the legs S being placed on the floor A which floor may also receive the side panels R.

As indicated in Fig. 2, where the wheels B on the structure A are lowered as into a pit F the roof may assume the position as indicated at 45 in Fig. 2 in which case the elevation ramps D and the descending ramps E are not required.

Referring to Fig. 5, a control box 5 may be positioned at one corner of the floor structure A adjacent one of the corner posts 46. Although four corner posts 46 are shown supporting the roof from the floor A, an additional number may be provided at each side of the vehicle.

The control box Y has a rectangular receptacle structure 47 in which are positioned the circuit breaker 48 for the lights, the magnetic starter for the blower 49, the blower fuse box 50, the power distribution junction box 51, the chain drive fuse box 52 and the chain magnetic starter unit 53.

The entire unit may be closed by means of the door 54 and suitable locking arrangements.

It is thus apparent that the applicant has provided a simple, readily transported attractive car washing system which may be moved from place to place in accordance with changing requirements without requiring a permanent built-in installation.

The unit when set up, with its fluorescent lighting and translucent white walls is quite attractive and lends itself to farmer market or supermarket surroundings.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A mobile car washer unit for location at a place where there are substantial requirements for car washing facilities and for movement from place to place without permanent installation comprising a transportable bed, a roof supported above said bed, water wash and drying units on said bed, side walls movable into open and closed positions and means to move said car through said unit and over said bed, said last mentioned means consisting of a continuous chain having sprockets at each end of the bed and wheels along said bed to enable said bed to be moved from place to place, said washing and drying units consisting of inverted U-shaped conduits extending the full height and width of the mobile unit and in close juxtaposition to one another and remote from the ends of said bed.

2. A portable wheeled mobile car washer unit having a flat rectangular elongated base structure having entrance and exit ramps and being supported upon four rubber tired wheels, said base structure on its top side having a central longitudinal chain drive extending in a forward direction on the top thereof and in a reverse direction on the bottom thereof, side longitudinally extending tracks with inturned inlet end portions of U-shaped cross section to guide the inside faces of the wheels, inclined entrance and exit ramps to the entrance and exit ends of said base structure, a top cover structure, vertical posts at the corners of the base structure supporting the top cover structure, hinged side panels extending outwardly from the sides of the base structure forming walk ways along the side of the base structure, and inverted U-shaped conduit members in close juxtaposition extending upwardly from and transversely across the top and sides of the middle portion of the unit, successively to spray water and blow air upon the vehicle, said conduit members being remotely positioned from the ends of the base structure.

References Cited in the file of this patent

UNITED STATES PATENTS

| | | |
|---|---|---|
| 774,279 | Seabury | Nov. 8, 1904 |
| 1,682,902 | Gibson | Sept. 4, 1928 |
| 2,732,846 | Berezny | Jan. 31, 1956 |
| 2,807,271 | Spinner | Sept. 24, 1957 |